US012776066B1

(12) United States Patent
Harvill et al.

(10) Patent No.: US 12,776,066 B1
(45) Date of Patent: Oct. 27, 2026

(54) VIRTUAL CREATION AND VISUALIZATION OF PHYSICALLY BASED VIRTUAL MATERIALS

(71) Applicant: Aurora Operations, Inc., Pittsburgh, PA (US)

(72) Inventors: Alex Harvill, Berkeley, CA (US); Allen Hemberger, Chicago, IL (US); Michael Fu, Albany, CA (US)

(73) Assignee: Aurora Operations, Inc, Pittsburgh, PA (US)

( * ) Notice: Subject to any disclaimer, the term of this patent is extended or adjusted under 35 U.S.C. 154(b) by 126 days.

(21) Appl. No.: 18/895,645

(22) Filed: Sep. 25, 2024

Related U.S. Application Data

(63) Continuation of application No. 17/557,923, filed on Dec. 21, 2021, now Pat. No. 12,131,503.

(60) Provisional application No. 63/214,542, filed on Jun. 24, 2021, provisional application No. 63/128,822, filed on Dec. 21, 2020.

(51) Int. Cl.

| | |
|---|---|
| ***G06T 7/80*** | (2017.01) |
| ***G06T 15/04*** | (2011.01) |
| ***G06T 15/08*** | (2011.01) |
| ***G06T 15/50*** | (2011.01) |
| ***G06T 15/80*** | (2011.01) |
| ***G06T 17/20*** | (2006.01) |

(52) U.S. Cl.
CPC ................ *G06T 7/80* (2017.01); *G06T 15/04* (2013.01); *G06T 15/08* (2013.01); *G06T 15/506* (2013.01); *G06T 15/80* (2013.01); *G06T 17/20* (2013.01); *G06T 2207/20048* (2013.01)

(58) Field of Classification Search
None
See application file for complete search history.

(56) References Cited

U.S. PATENT DOCUMENTS

| | | | | |
|---|---|---|---|---|
| 6,593,925 | B1 * | 7/2003 | Hakura | G06T 9/001 345/426 |
| 11,109,065 | B2 * | 8/2021 | Hemmer | H04N 19/593 |
| 2011/0047163 | A1 * | 2/2011 | Chechik | G06F 16/78 707/E17.071 |
| 2019/0156520 | A1 * | 5/2019 | Mammou | G08B 1/00 |

(Continued)

OTHER PUBLICATIONS

Dicarlo, Jeffrey M et al., "Illuminating Illumination", 2001, https://ldblp.uni-trier.de/rec/conf/imaging/DiCarloXWO1.html?view=bibtex, 8 pgs.

(Continued)

*Primary Examiner* — Nurun Flora
(74) *Attorney, Agent, or Firm* — Patent Law Works, LLP

(57) ABSTRACT

Virtual creation and visualization of a physically based virtual material swatch includes identifying a capture device model to support for use in the generation of the virtual material swatch, determining camera response of the capture device model, determining lookup tables of linearly transformed cosines for a plurality of parameters of a shading model, identifying a sample physical material, and determining material description for the sample physical material. A system and method may also include scanning a user physical material, selecting one or more of material preset, geometry preset, environment preset, and camera preset, and creating a virtual material swatch for the user physical material based on the selections.

20 Claims, 11 Drawing Sheets

(56) References Cited

U.S. PATENT DOCUMENTS

| | | | | |
|---|---|---|---|---|
| 2020/0021847 | A1* | 1/2020 | Kim | H04N 19/597 |
| 2023/0419599 | A1* | 12/2023 | Chai | G06T 15/506 |

OTHER PUBLICATIONS

Hui, Zhuo et al., “Illuminant Spectra-based Source Separation Using Flash Photography”, https://arxiv.org/• bs/1704.05564, Nov. 27, 2017, 10 pgs.

Barrow, H.G et al., “Recovering Intrinsic Scene Characteristics From Images”, http://web.mit.edu/• cosci/Papers/Barrow-Tenenbaum78.pdf, 1978, 24 pgs.

Aksoy, Yagiz et al., “A Dataset of Flash and Ambient Illumination Pairs from the Crowd”, http://yaksoy.github.io/nashambient/, 2018, 16 pgs.

Eisemann, Elmar et al., “Flash Photography Enhancement via Intrinsic Relighting”, https://dl.acm.org/• oi/10.1145/1015706. 1015778, 2004 6 pgs.

Hasinoff, Sam et al., “Burst photography for high dynamic range and low-light imaging on mobile cameras”, https:/ldl.acm.org/doi/10.1145/2980179.2980254, 2016, 12 pgs.

Ward, Greg, “Fast, Robust Image Registration for Compositing High Dynamic Range Photographs from Handheld Exposures”, http://www.anyhere.com/gward/papers/jgtpap2.pdf, 2012, 14 pgs.

Burley, Brent, “Physically-Based Shading at Disney”, https://www.semanticscholar.org/paper/Physically-Based-Shading-at-Disney-Burley/3f4b29a0cc51f1 ba8baaf99ac008f3acf18d04df, 2012, 27 pgs.

Lagarde, Sebastian, “An Artist-Friendly Workflow for Panoramic HORI”, https://blogs.unity3d.• m/2016/08/28/59924/, 2016, 4 pgs.

Lagarde, Sebastian et al., “An Artist-Friendly Workflow for Panoramic HORI”, https://blog.selfshadow.com/t>ublications/s2016-shadingcourse/unity/s2016_pbs_unity_hdri_notes.pdf, 2016, 86 pgs.

Lagarde, Sebastian et al., “An Artist-Friendly Workflow for Panoramic HORI”, https://blog.selfshadow.com/publications/s2016-shading-course/unity/s2016_pbs_unity_hdri.pdf, 2016, 63 pgs.

Deschaintre, Valentin et al., “Single-Image SVBRDF Capture with a Rendering-Aware Deep Network”, https://• rxiv.org/abs/1810.09718, 2018, 15 pgs.

Guarnera, Claudio et al., “BRDF Representation and Acquisition”, https://dLacm.org/doi/10.5555/3059330.3059335• 016, 26 pgs.

Heitz, Eric et al., “Real-Time Polygonal-Light Shading with Linearly Transformed Cosines”, https:J/dl.acm.org/• oi/10.1145/2897824.2925895, 2016, 8 pgs.

Hill, Stephen et al., “Real-Time Area Lighting: a Journey from Research to Production”, http:J/advances.ealtimerendering.com/s2016/s2016_1tc_md.pdf, 2016, 111 pgs.

Reinhard, Erik et al., “High Dynamic Range Imaging”, 2nd Edition, May 25, 2010.

* cited by examiner

VIRTUAL CREATION AND VISUALIZATION OF PHYSICALLY BASED VIRTUAL MATERIALS

CROSS-REFERENCE TO RELATED APPLICATIONS

This application is a continuation of U.S. patent application Ser. No. 17/557,923, filed Dec. 21, 2021, titled "Virtual Creation and Visualization of Physically Based Virtual Materials" which claims priority to U.S. Provisional Application Ser. No. 63/128,822, filed Dec. 21, 2020, titled "System and Method for Material Acquisition, Classification and Visualization," and to U.S. Provisional Application Ser. No. 63/214,542, filed Jun. 24, 2021, titled "System and Method for Creation and Visualization of Physically Based Virtual Material Swatches," which are hereby incorporated herein in their entirety by this reference.

BACKGROUND

Oftentimes, a challenge with the visualization of physical materials is the inaccuracy in its imagery. This is because a material's visual qualities are, with few exceptions, inextricably related to the lighting conditions under which it is being viewed. For example, a color and finish of a material may differ depending on the time of day during which it is viewed. The manner in which a material object interacts with its environment can significantly alter its apparent material properties. Inadequate considerations of the environmental conditions leads to low-quality and inaccurate material visualizations. Moreover, acquisition of accurate material imagery via photography and computer-generated renders is cost prohibitive and time consuming.

SUMMARY

This specification relates to methods and systems for facilitating virtual creation and visualization of physically based virtual materials. According to one aspect of the subject matter described in this disclosure, a method includes identifying a capture device model to support for use in generation of a virtual material swatch, determining a camera response of the capture device model, determining lookup tables of linearly transformed cosines for a plurality of parameters of a shading model, identifying a sample physical material, and determining a material description for the sample physical material.

In general, another aspect of the subject matter described in this disclosure includes a system comprising one or more processors and memory operably coupled with the one or more processors, wherein the memory stores instructions that, in response to the execution of the instructions by one or more processors, cause the one or more processors to perform operations including identifying a capture device model to support for use in generation of a virtual material swatch, determining camera response of the capture device model, determining lookup tables of linearly transformed cosines for a plurality of parameters of a shading model, identifying a sample physical material, determining a material description for the sample physical material using the camera response, the lookup tables of linearly transformed cosines, and the sample physical material, and adding the material description for the sample physical material to a library of material presets.

Other implementations of one or more of these aspects include corresponding systems, apparatus, and computer programs, configured to perform the actions of the methods, encoded on computer storage devices.

These and other implementations may each optionally include one or more of the following features. For instance, the method further comprises acquiring a scan of a user material sample at runtime using the capture device model, receiving a selection of a material preset from the library of material presets, receiving a selection of an environment preset from a library of environment presets, receiving a selection of a geometry preset from a library of geometry presets, receiving a selection of a camera preset from a library of camera presets, generating the virtual material swatch of the user material sample based on the selections of the material preset, the environment preset, the geometry preset, and the camera preset, and generating one or more output media based on the virtual material swatch. For instance, the features may also include that determining the camera response of the capture device model includes determining a range of ISO values for each shutter speed of the capture device model using a display device, determining brightness value for each shutter speed of the capture device model using the display device, determining a dataset of color information for each triplet of brightness, ISO, and shutter speed captured by the capture device model and a color measurement device using the display device, and solving for a multidimensional lookup table describing the camera response of the capture device model using a first machine learning based solver and the dataset of color information, that determining lookup tables of linearly transformed cosines for the plurality of parameters of the shading model includes fitting the linearly transformed cosines to each parameter of the shading model using a second machine learning based solver. For example, the features may further include that determining the material description for the sample physical material includes positioning the sample physical material within a field of view of the capture device in a reference mode, acquiring a sample physical material dataset including image data and depth data of the sample physical material using the capture device, generating a three dimensional scene of the sample physical material using the sample physical material dataset, and determining the material description from the three dimensional scene of the sample physical material using inverse rendering, and that the multidimensional lookup table includes a mapping algorithm for forward transform mapping and backward transform mapping. In another example, the features may also include that the sample physical material is one from a group of paint, plastic, metal, fabric, asphalt, concrete, brick, and glass, and that the parameters of the shading model are associated with one or more of roughness, diffuse albedo, subsurface scattering, specular albedo, sheen, opacity, dullness, ambient occlusion, clear coat, emissive color, index of refraction, transmission, anisotropy, and shininess.

BRIEF DESCRIPTION OF THE DRA WINGS

These and other aspects and features of the present implementations will become apparent upon review of the following description of specific implementations in conjunction with the accompanying figures, wherein.

DETAILED DESCRIPTION

Overview

Figure 1:
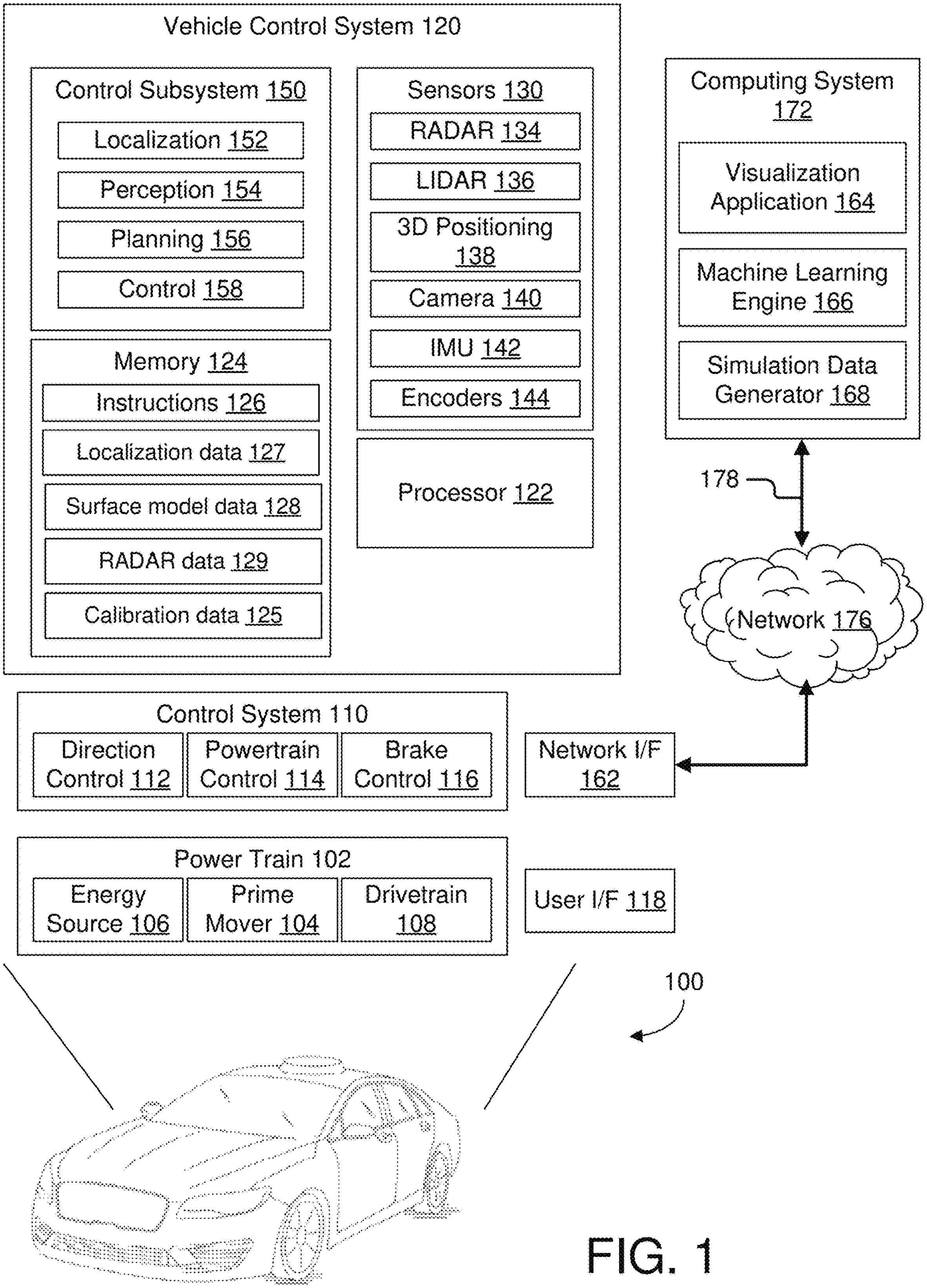
FIG. 1 is a block diagram illustrating an example hardware and software environment for an autonomous vehicle according to some implementations.

In the following disclosure, a visualization application is used to facilitate virtual creation and visualization of physically based virtual materials. The virtual creation and visualizations of various physical materials in different physical environments has many useful applications. For example, a visualization showing a virtual environment in which a virtual version of a physical material is realistically, visually, and graphically depicted with appropriate simulated lighting that is based on a real physical environment may be converted into simulation data useful for procedural scene generation in the training of an autonomous vehicle. The visualization application facilitates with the creation of virtual material swatches. In some implementations, a user may acquire a scan of a physical material sample using a capture device, such as a mobile computing device. The scan may be used to measure a plurality of visual properties of the material and prepopulate the input parameters of a shading model that best approximates the material. For the scan to work, the visualization application performs calibration and preprocessing once for each model of capture device that is to be supported for use at runtime. The calibration and preprocessing phase generates a SuperLUT-a multidimensional lookup table to model camera response function for each model of capture device. The aim of the SuperLUT is to correct nonlinearities that exist in the photographic pipeline (e.g., the hardware and software) that governs the camera component on the capture device model being calibrated. The SuperLUT includes a mapping algorithm. For example, the mapping algorithm may be used to map a synthetically rendered high dynamic range image to the native intensity of the capture device model. To complete the preprocessing phase, the visualization application converts a collection of sample physical materials into material descriptions and organizes the material descriptions into a library of material presets. For example, the library of material presets serves as a starting point for users at runtime. The visualization application uses the outputs of the calibration and preprocessing phase in the generation of virtual material swatches. A virtual material swatch may be defined as a virtual representation of a physically based material that includes a virtual three dimensional scene and output media. In some implementations, the visualization application receives user selection of one or more virtual assets, such as a material preset, an environment preset, geometry preset, and camera preset for creating the virtual material swatch based on the physical material sample. The visualization application constructs a virtual scene using the environment lighting, the renderable scene geometry, the virtual camera, and the material description which is assigned to the renderable scene geometry. Once this virtual scene is constructed, the visualization application creates one or more output media to visually describe the physical material sample.

While the present disclosure may describe the techniques herein in the context of visualization of physically based virtual materials in the visible portion of the electromagnetic spectrum, it should be understood that the architecture, principles, and components of the present disclosure may also be used to provide visualization of physically based virtual materials in other, invisible portions of the electromagnetic spectrum, such as ultraviolet, near infrared, etc.

Autonomous Vehicle

Referring to the drawings, wherein like numbers denote like parts throughout the several views, FIG. 1 illustrates an example hardware and software environment for an autonomous vehicle within which various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling by land, by sea, by air, underground, undersea, and/or in space, and it will be appreciated that the aforementioned components 102-116 may vary widely based upon the type of vehicle within which these components are utilized.

For simplicity, the implementations discussed hereinafter will focus on a wheeled land vehicle such as a car, van, truck, bus, etc. In such implementations, the prime mover 104 may include one or more electric motors and/or an internal combustion engine (among others). The energy source 106 may include, for example, a fuel system (e.g., providing gasoline, diesel, hydrogen, etc.), a battery system, solar panels or other renewable energy source, and/or a fuel cell system. The drivetrain 108 includes wheels and/or tires along with a transmission and/or any other mechanical drive components suitable for converting the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some implementations, multiple electric motors (e.g., dedicated to individual wheels or axles) may be used as a prime mover. In the case of a hydrogen fuel cell implementation, the prime mover 104 may include one or more electric motors and the energy source 106 may include a fuel cell system powered by hydrogen fuel.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to airplanes, space vehicles, helicopters, drones, military vehicles, all-terrain or tracked vehicles, ships, submarines, construction equipment etc., will necessarily utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, full or semi-autonomous control over the vehicle 100 is implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s) ")) and/or central processing unit(s) ("CPU(s)").

Sensors 130 may include various sensors suitable for collecting information from a vehicle's surrounding environment for use in controlling the operation of the vehicle 100. For example, sensors 130 can include RADAR sensor 134, LIDAR (Light Detection and Ranging) sensor 136, a 3D positioning sensor 138, e.g., a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can optionally include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle 100 in three directions. One or more encoders 144, such as wheel encoders may be used to monitor the rotation of one or more wheels of vehicle 100.

The outputs of sensors 130 may be provided to a set of control subsystems 150, including, a localization subsystem 152, a perception subsystem 154, a planning subsystem 156, and a control subsystem 158. The localization subsystem 152 is principally responsible for precisely determining the location and orientation (also sometimes referred to as "pose") of the vehicle 100 within its surrounding environment, and generally within some frame of reference. The perception subsystem 154 is principally responsible for detecting, tracking, and/or identifying objects within the environment surrounding vehicle 100. A machine learning model in accordance with some implementations can be utilized in tracking objects. The planning subsystem 156 is principally responsible for planning a trajectory or a path of motion for vehicle 100 over some timeframe given a desired destination as well as the static and moving objects within the environment. A machine learning model in accordance with some implementations can be utilized in planning a vehicle trajectory. The control subsystem 158 is principally responsible for generating suitable control signals for controlling the various controls in the vehicle control system 120 in order to implement the planned trajectory of the vehicle 100. Similarly, a machine learning model can be utilized to generate one or more signals to control the autonomous vehicle 100 to implement the planned trajectory.

It will be appreciated that the collection of components illustrated in FIG. 1 for the vehicle control system 120 is merely one example. Individual sensors may be omitted in some implementations. Additionally, or alternatively, in some implementations, multiple sensors of the same types illustrated in FIG. 1 may be used for redundancy and/or to cover different regions around a vehicle. Moreover, there may be additional sensors beyond those described above to provide actual sensor data related to the operation and environment of the wheeled land vehicle. Likewise, different types and/or combinations of control subsystems may be used in other implementations. Further, while subsystems 152-158 are illustrated as being separate from processor 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors 122 illustrated in FIG. 1, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 118 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 176 to permit the communication of information with other computers and electronic devices, including, for example, a central service, such as a cloud service, from which the vehicle 100 receives information including trained machine learning models and other data for use in autonomous control thereof. The one or more networks 176, for example, may be a communication network that includes a wide area network ("WAN") such as the Internet, one or more local area networks ("LANs") such as Wi-Fi LANs, mesh networks, etc., and one or more bus subsystems. The one or more networks 176 may optionally utilize one or more standard communication technologies, protocols, and/or inter-process communication techniques. In some implementations, data collected by the one or more sensors 130 can be uploaded to a computing system 172 via the network 176 for additional processing.

In the illustrated implementation, the vehicle 100 may communicate via the network 176 and signal line 178 with a computing system 172. In some implementations, computing system 172 is a cloud-based computing device. As described below in more detail with reference to FIG. 3, the computing device 172 includes a visualization application 164, a simulation data generator 168 and a machine learning engine 166. In some implementations not shown in FIG. 1, the visualization application 164 may be configured and executed on a combination of the computing system 172 and the vehicle control system 120 of the vehicle 100. For example, the visualization application **164*a* may execute some functionality on the vehicle control system 120 of the vehicle 100 while the visualization application 164*b* executes the remaining functionality on the computing system 172. In other implementations, either the computing system 172 or the vehicle control system 120 of the vehicle 100 alone executes the functionality of the visualization application 164. In some implementations, the simulation data generator 168 operates on the computing system 172 to receive virtual material swatch data from the visualization application 164 and generate simulation data that may be used by the machine learning engine 166. The machine learning engine 166, operable on the computing system 172, generates a machine learning model based on the simulation scenario and simulated data for use in autonomous control of the vehicle 100. The machine learning model is sent from the computing system 172 to vehicle 100 to be used in the appropriate control subsystem 152-158** for use in performing its respective function.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer (e.g., computing system 172) coupled to vehicle 100 via network 176, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program codes described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The example environment illustrated in FIG. 1 is not intended to limit implementations disclosed herein. Indeed, other alternative hardware and/or software environments may be used without departing from the scope of implementations disclosed herein.

Virtual Material Creation and Visualization System

Figure 2A:
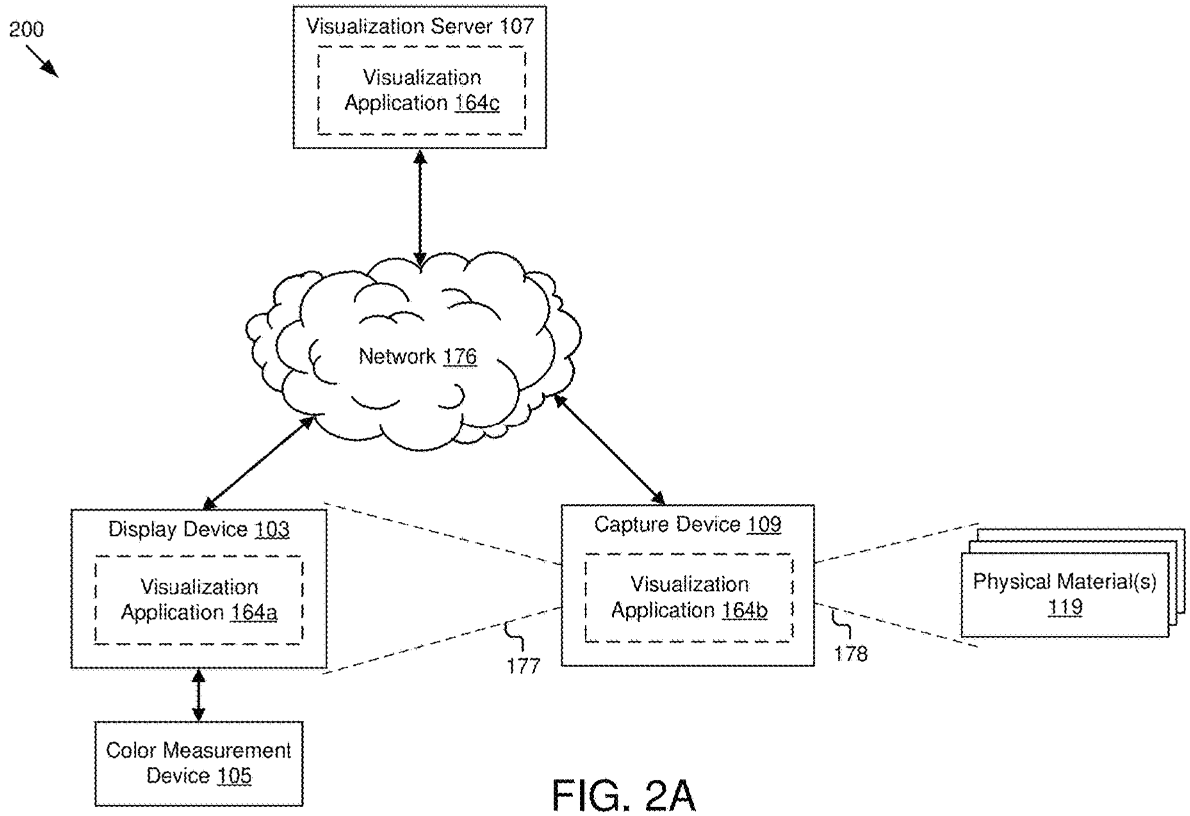
FIG. 2A is a block diagram illustrating an example system for facilitating virtual creation and visualization of physically based virtual materials according to some implementations.

FIG. 2A is a block diagram illustrating an example system for facilitating virtual creation and visualization of physically based virtual materials according to some implementations. The illustrated system 200 may include a capture device 109, a display device 103, a color measurement device 105, and a visualization server 107, which are communicatively coupled via a network 176 for interaction with one another. The physical material(s) 119 may include physical material samples used for generating material presets during preprocessing and/or user material samples for generating virtual material swatches during runtime as described herein. The display device 103, the color measurement device 105, and the capture device 109 can be accessed by users. The visualization server 107 may be configured to coordinate the measurement activities of the capture device 109, the display device 103, and the color measurement device 105. In FIG. 1 and the remaining figures, a letter after a reference number, e.g., "164*a*," represents a reference to the element having that particular reference number. A reference number in the text without a following letter, e.g., "164," represents a general reference to instances of the element bearing that reference number.

The network 176 may be wired or wireless and may have numerous different configurations including a star configuration, token ring configuration, or other configurations. Furthermore, the network 176 may include any number of networks and/or network types. For example, the network 176 may include a local area network (LAN), a wide area network (WAN) (e.g., the Internet), virtual private networks (VPNs), mobile (cellular) networks, wireless wide area network (WWANs), WiMAX® networks, Bluetooth® communication networks, peer-to-peer networks, and/or other interconnected data paths across which multiple devices may communicate, various combinations thereof, etc. The network 176 may also be coupled to or include portions of a telecommunications network for sending data in a variety of different communication protocols. In some implementations, the network 176 may include Bluetooth communication networks or a cellular communications network for sending and receiving data including via short messaging service (SMS), multimedia messaging service (MMS), hypertext transfer protocol (HTTP), direct data connection, WAP, email, etc. In some implementations, the data transmitted by the network 176 may include packetized data (e.g., Internet Protocol (IP) data packets) that is routed to designated computing devices coupled to the network 176. Although FIG. 2A illustrates one network 176 coupled to the capture device 109, the display device 103, the color measurement device 105, and the visualization server 107, in practice one or more networks 176 can be connected to these entities.

The display device 103 and the capture device 109 may be computing devices or systems having data processing and communication capabilities. In some implementations, the display device 103 and the capture device 109 may include a memory, a processor (e.g., virtual, physical, etc.), a power source, a network interface, software and/or hardware components, such as a display, graphics processing unit (GPU), wireless transceivers, keyboard, camera (e.g., webcam, front facing camera, rear-facing camera, etc.), sensors (e.g., depth sensor, LIDAR, infrared (IR) sensor, etc.), firmware, operating systems, web browsers, applications, drivers, and various physical connection interfaces (e.g., USB, HDMI, etc.). The display device 103 and the capture device 109 may couple to and communicate with one another and the other entities of the system 100 via the network 176 using a wireless and/or wired connection. Examples of display devices 103 and/or capture devices 109 may include, but are not limited to, laptops, desktops, tablets, mobile phones (e.g., smartphones, feature phones, etc.), smart TVs, motion sensing devices, user wearable computing devices or any other electronic device capable of accessing a network 176. In the example of FIG. 2A, the display device 103 is configured to implement a visualization application 164*a* and the capture device 109 is configured to implement a visualization application 164*b* described in more detail below. The display device 103 and the capture device 109 may include an emissive display (e.g., plasma display panels (PDPs), light emitting diodes (LEDs), organic light emitting diodes (OLEDs), field emission displays (FEDs), etc.) for emitting light with different intensity and color. The display device 103 and the capture device 109 may be adapted to send and receive data to and from the visualization server 107. For example, the capture device 109 may be adapted to generate and display user interface for creating, viewing, and editing a virtual material swatch. The capture device 109 may be configured to capture first image data of the information presented by the display device 103 within a first field of view 177 and a second image data of the physical material(s) 119 within a second field of view 178. While only one capture device 109 is depicted in FIG. 2A, the system 200 may include any number of capture devices 109 of different types to support during preprocessing as described herein. In addition, the display device 103 and the capture device 109 may be the same or different types of computing devices.

The color measurement device 105 may be a colorimeter or a spectrophotometer configured to measure and optimize the capture device 109 and the display device 103. For example, the color measurement device 105 is coupled to a screen of the display device 103 for taking color measurements in XYZ Nits (e.g., scene referred linear color values in Nits space). In another example, the color measurement device 105 is coupled to a screen of the capture device 109 for measuring screen light source intensity in XYZ Nits. The color measurement device 105 may be used to take measurements of sample materials to serve as "ground truth" or "reference" diffuse albedo values. For example, the sample material name and a measured sRGB color combine to form a digital material sample.

The visualization server 107 may be, or may be implemented by, a computing device or system including a processor, a memory, applications, a database, and network communication capabilities. In FIG. 2A, the components of the visualization server 107 may be configured to implement a visualization application 164*c* described in more detail below. In some implementations, the visualization server 107 may be configured to send instructions to the capture device 109, the display device 103, and the color measurement device 105, receive captured images and measure results, and execute preprocessing and runtime stages of virtual creation and visualization of virtual materials swatches. In some implementations, the visualization server 107 may be a hardware server, a software server, or a combination of software and hardware. For example, the visualization server 107 may include one or more hardware servers, virtual servers, server arrays, storage devices and/or systems, etc., and/or may be centralized or distributed/ cloud-based. In some implementations, the visualization server 107 may include one or more virtual servers, which operate in a host server environment and access the physical hardware of the host server including, for example, a processor, a memory, applications, a database, storage, network interfaces, etc., via an abstraction layer (e.g., a virtual machine manager). In some implementations, the visualization server 107 may be a Hypertext Transfer Protocol (HTTP) server, a Representational State Transfer (REST) service, or other server type, having structure and/or functionality for processing and satisfying content requests and/or receiving content from one or more of the capture device 109, the display device 103, and the color measurement device 105 that are coupled to the network 176. In addition, while a single visualization server 107 is depicted in FIG. 2A, it should be understood that there may be any number of visualization servers 107 or a server cluster.

The visualization application 164 may include software and/or logic to provide the functionality for facilitating virtual creation and visualization of physically based virtual materials. The visualization application 164 may be stored and executed on a combination of the capture device 109, the display device 103, and the visualization server 107, or by any one of the capture device 109, the display device 103, or the visualization server 107. In some implementations, the visualization application 164 may be a thin-client application with some functionality executed on the capture device 109 and the display device 103 and additional functionality executed on the visualization server 107. In some implementations, the visualization application 164 is code operable in a web browser, a web application accessible via a web browser on the capture device 109, a native application (e.g., mobile application, installed application, etc.) on the capture device 109, a combination thereof, etc. Additional structure, acts, and/or functionality of the visualization application 164 is further discussed below with reference to at least FIG. 3.

Figure 2B:
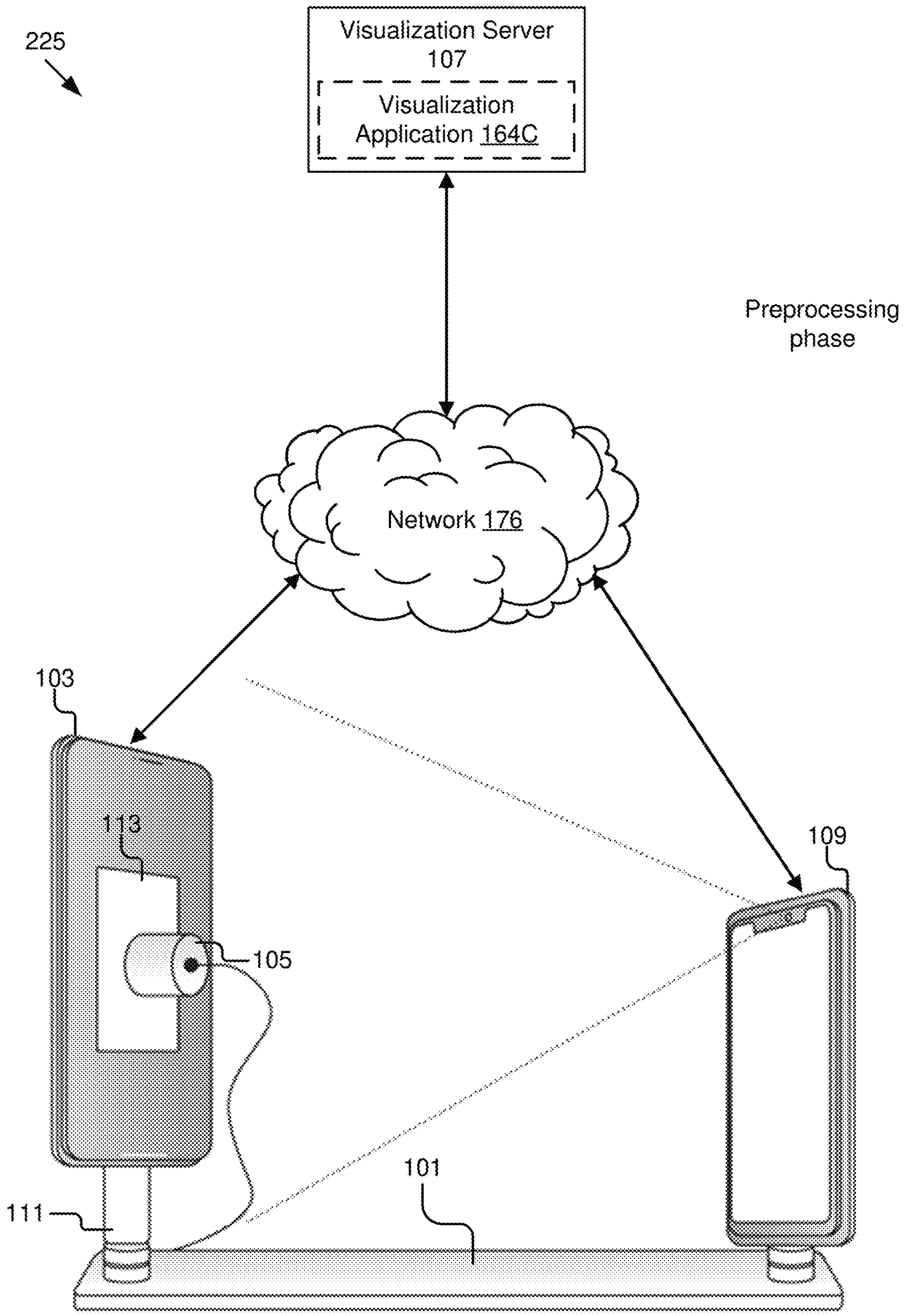
FIG. 2B is a block diagram illustrating another example system for facilitating virtual creation and visualization of physically based virtual materials according to some implementations.

FIG. 2B is a block diagram illustrating another example system for facilitating virtual creation and visualization of physically based virtual materials according to some implementations. The illustrated system 225 includes a rig composed of a horizontal rigid mounting rail 101 that connects a capture device 109 and a display device 103 using adjustable rotating mounts 111. The capture device 109 and a display device 103 are mounted facing each other. In this example system 225, the capture device 109 is a smartphone mobile device and the display device 103 is a tablet computing device. A color measurement device 105 is attached to the display device 103 in the screen capture area 113. The visualization server 107 is communicatively coupled to the capture device 109, the display device 103, and the color measurement device 105 through the network 176. The rig in the illustrated system 225 may be used in the calibration and preprocessing phase conducted for each model of capture device 109 supported for the virtual creation and visualization of physically based virtual materials. As part of the calibration and preprocessing phase, the rig in the illustrated system 225 may also be used for evaluating a collection of physical material samples under real-world lighting conditions or illuminated in the rig in a reference mode for building a library of material presets. The capture device 109 is used as a calibrated light source to illuminate the physical material sample during capture. In some implementations, the display device may be used as an auxiliary light source during capture of the physical material sample in reference mode. A physical material sample is a part or whole representative sample of a material used for measurement. The overall size of a chart or a backing board used for calibrating the physical material sample fits within the field-of-view of the capture device 109 that will capture an image of it at a distance required by the calibration process. The rig in the illustrated system 225 is a portable rigid armature that allows for concurrent mounting of a capture device 109 and a calibration component. For example, the calibration component may include the display device 103 and/or a feeder used to automate the swapping of physical material samples during capture. The armature is built such that the capture device 109 and the calibration component can be mounted a measurable distance from one another. Each of the individual mounts for the capture device 109 and the calibration component are independently-adjustable, with the ability to be shifted closer to or further from one another. Further, each mount can be rotated with respect to one another, and affords the ability to offset one from the other vertically and/or horizontally, to allow the two to be positioned optimally with respect to one another. The armature is portable, so that it may be easily transported among different capture environments while preserving the positional relationship between the capture device 109 and the calibration component.

Figure 2C:
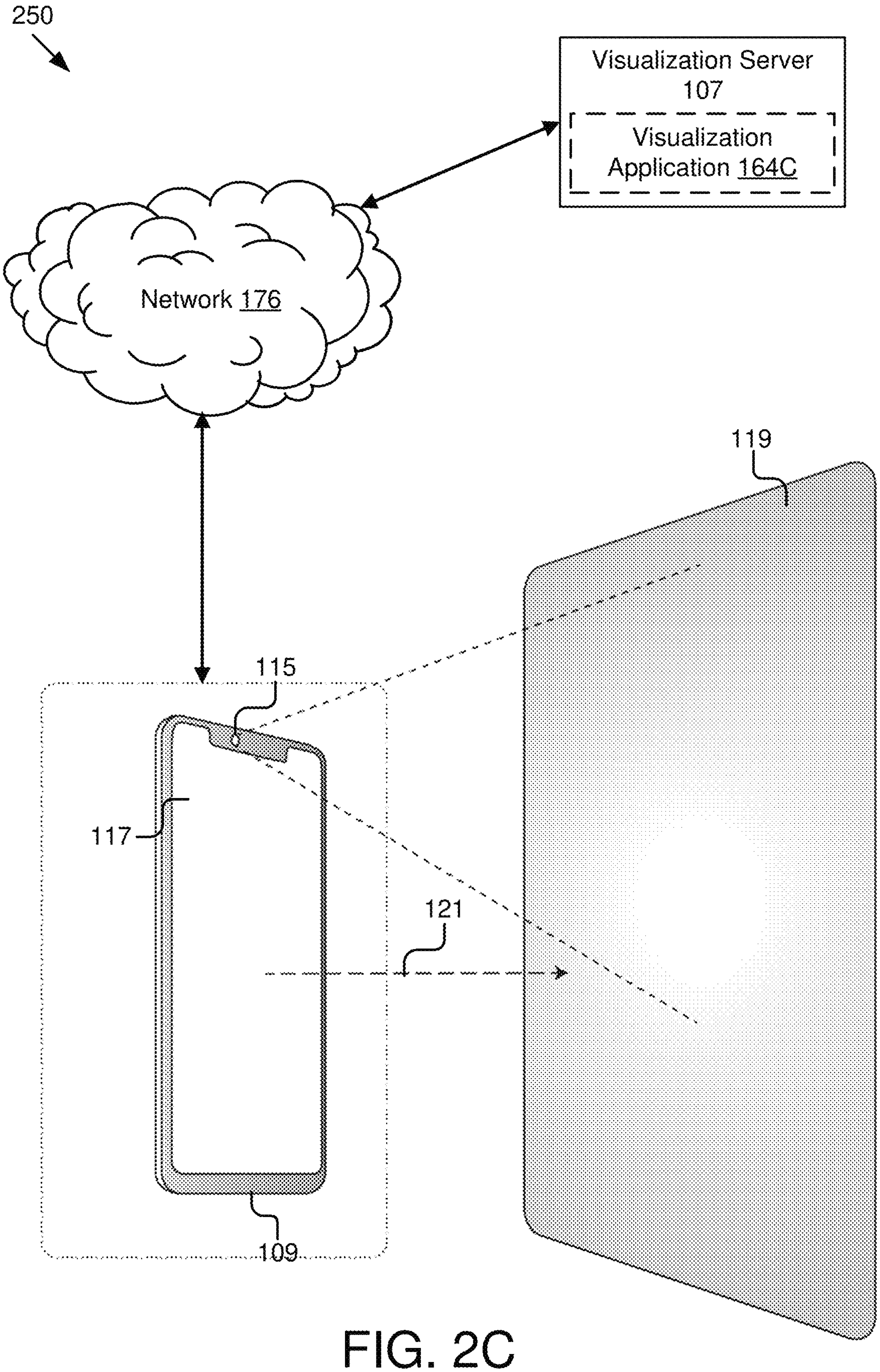
FIG. 2C is a block diagram illustrating yet another example system for facilitating virtual creation and visualization of physically based virtual materials according to some implementations.

FIG. 2C is a block diagram illustrating yet another example system for facilitating virtual creation and visualization of physically based virtual materials according to some implementations. The illustrated system 250 includes a configuration of a capture device 109 with a front facing camera 115 and calibrated display screen 117 used to capture color and depth images of a material sample 119. The calibrated display screen 117 is facing the material sample 119 at a distance 121. The distance 121 may be same as the distance between the capture device 109 and the display device 103 on adjustable mounts in the rig shown in FIG. 2B, or the distance may be different. The calibrated display screen 117 illuminates on and off the material sample 119. The front facing camera 115 of the capture device 109 captures image data and depth data of the illuminated and non-illuminated material sample 119. The visualization server 107 is communicatively coupled to the capture device 109 through the network 176. A user may acquire a material sample in a standalone mode using the configuration of FIG. 2C for building a virtual material swatch collection. In some implementations, the configuration of the illustrated system 250 may be used in a reference mode to acquire physical material samples to build a library of material presets.

Computing System 300

Figure 3:
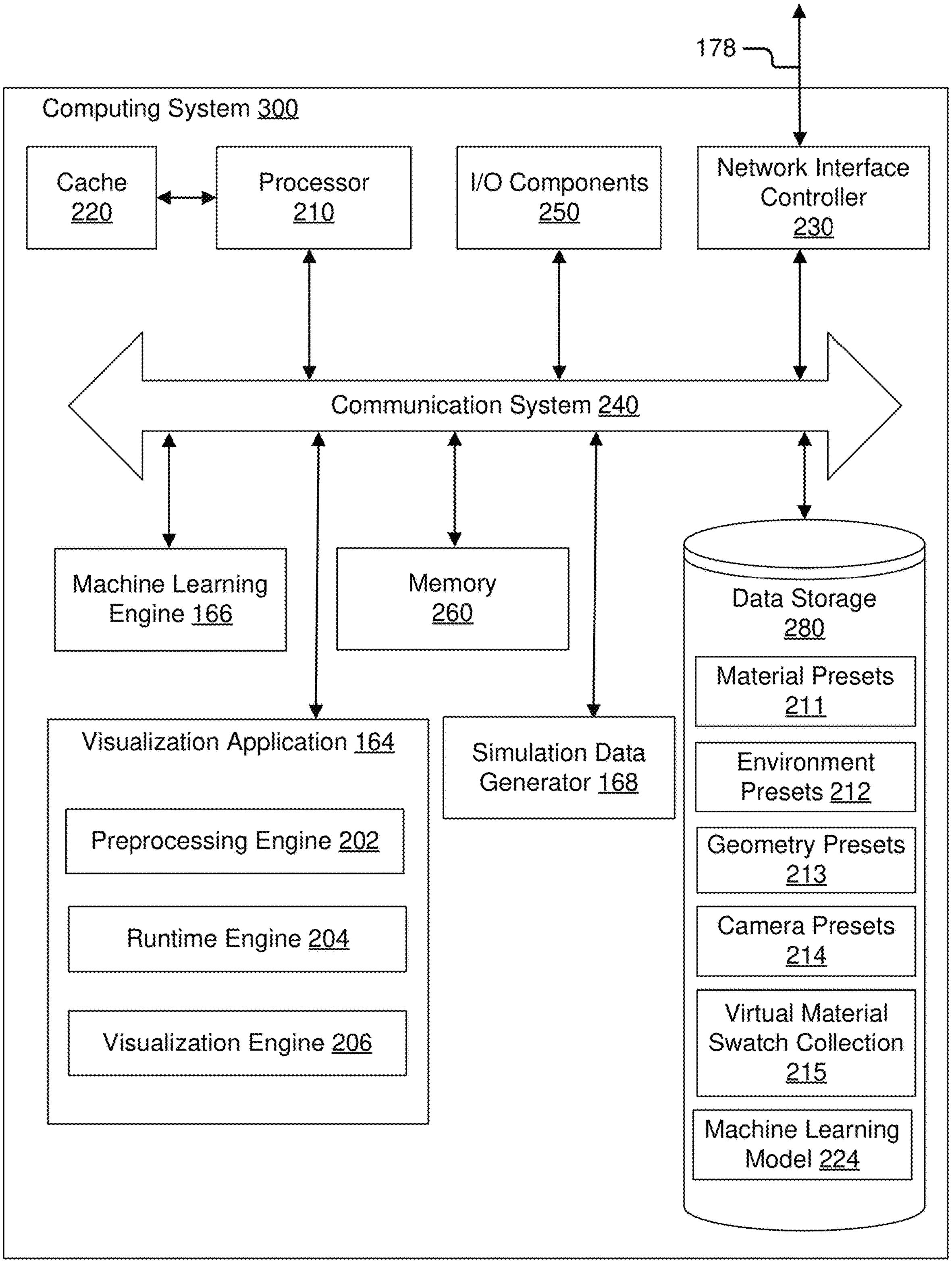
FIG. 3 is a block diagram illustrating an example computing system for virtual creation and visualization of physically based virtual materials according to some implementations.

FIG. 3 is a block diagram illustrating an example of a computing system 300 for virtual creation and visualization of physically based virtual materials according to some implementations. In some implementations, the computing system 300 may be the capture device 109, the display device 103, the visualization server 107, or a combination of the capture device 109, the display device 103, and the visualization server 107. In other implementations, the computing system 300 may be the computing system 172 described in reference to FIG. 1.

Referring to FIG. 3, the illustrated example computing system 300 includes one or more processors 210 in communication, via a communication system 240 (e.g., bus), with memory 260, at least one network interface controller 230 with network interface port for connection to a network (e.g., network 176 via signal line 178), a data storage 280, and other components, e.g., an input/output ("I/O") components interface 250 connecting to a display (not illustrated) and an input device (not illustrated), a visualization application 166, a simulated data generator 168, and a machine learning engine 166. Generally, the processor(s) 210 will execute instructions (or computer programs) received from memory 260. The processor(s) 210 illustrated incorporate, or are directly connected to, cache memory 220. In some instances, instructions are read from memory 260 into the cache memory 220 and executed by the processor(s) 210 from the cache memory 220.

In more detail, the processor(s) 210 may be any logic circuitry that processes instructions, e.g., instructions fetched from the memory 260 or cache 220. In some implementations, the processor(s) 210 are microprocessor units or special purpose processors. The computing device 300 may be based on any processor, or set of processors, capable of operating as described herein. The processor(s) 210 may be a single core or multi-core processor(s). The processor(s) 210 may be multiple distinct processors.

The memory 260 may be any device suitable for storing computer readable data. The memory 260 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 300 may have any number of memory devices as the memory 260. While the simulation data generator 168, the machine learning engine 166, and the visualization application 164 are illustrated as being separate from processor 210 and memory 260, it will be appreciated that in some implementations, some or all of the functionality of the components 164, 166, and 168 may be implemented with program code instructions resident in the memory 260 and executed by the processor 210.

The cache memory 220 is generally a form of computer memory placed in close proximity to the processor(s) 210 for fast read times. In some implementations, the cache memory 220 is part of, or on the same chip as, the processor (s) 210. In some implementations, there are multiple levels of cache 220, e.g., L2 and L3 cache layers.

The network interface controller 230 manages data exchanges via the network interface (sometimes referred to as network interface ports). The network interface controller 230 handles the physical and data link layers of the OSI model for network communication. In some implementations, some of the network interface controller's tasks are handled by one or more of the processors 210. In some implementations, the network interface controller 230 is part of a processor 210. In some implementations, a computing system 300 has multiple network interfaces controlled by a single controller 230. In some implementations, a computing system 300 has multiple network interface controllers 230. In some implementations, each network interface is a connection point for a physical network link (e.g., a cat-5 Ethernet link). In some implementations, the network interface controller 230 supports wireless network connections and an interface port is a wireless (e.g., radio) receiver/transmitter (e.g., for any of the IEEE 802.11 protocols, near field communication "NFC", Bluetooth, ANT, WiMAX, 5G, or any other wireless protocol). In some implementations, the network interface controller 230 implements one or more network protocols such as Ethernet. Generally, a computing device 300 exchanges data with other computing devices via physical or wireless links (represented by signal line 178) through a network interface. The network interface may link directly to another device or to another device via an intermediary device, e.g., a network device such as a hub, a bridge, a switch, or a router, connecting the computing device 172 to a data network such as the Internet.

The data storage 280 may be a non-transitory storage device that stores data for providing the functionality described herein. The data storage 280 may store, among other data, material presets 211, environment presets 212, geometry presets 213, camera presets 214, virtual material swatch collection 215, and a machine learning model or representation 224 as will be defined below.

The computing system 300 may include, or provide interfaces for, one or more input or output ("I/O") devices 250. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers. Other components may include an I/O interface, external serial device ports, and any additional co-processors. For example, a computing system 300 may include an interface (e.g., a universal serial bus (USB) interface) for connecting input devices, output devices, or additional memory devices (e.g., portable flash drive or external media drive). In some implementations, a computing device 300 includes an additional device such as a co-processor, e.g., a math co-processor can assist the processor 210 with high precision or complex calculations.

Visualization Application 164

In implementations consistent with the disclosure, the visualization application 164 is utilized to facilitate creation and visualization of physically based virtual material swatches. In some implementations, the visualization application 164 includes a preprocessing engine 202, a runtime engine 204, and a visualization engine 206. The preprocessing engine 202, the runtime engine 204, and the visualization engine 206 of the visualization application 164 and separately the machine learning engine 166 are example components in which the techniques described herein may be implemented and/or with which systems, components, and techniques described herein may interface. While described in the context of the computing system 300, it should be understood that the operations performed by one or more components 202, 204, 206, 166, and 168 of FIG. 3 may be distributed across multiple computing systems. In some implementations, one or more aspects of components 202, 204, 206, 166, and 168 may be combined into a single system and/or one or more aspects may be implemented by the computing system 300. For example, in some implementations, aspects of the preprocessing engine 202 may be combined with aspects of the runtime engine 204. In another example, aspects of runtime engine 204 may be combined with aspects of the machine learning engine 166. Engines in accordance with many implementations may each be implemented in one or more computing devices that communicate, for example, through the communication network 176.

In some implementations, the preprocessing engine 202 identifies a list of capture device models to calibrate in order to support their use in the creation of virtual material swatches. A primary stage of the visualization process includes the creation of virtual material swatches. This may be performed using two methods. In the first method, a user may describe the properties for a virtual material by selecting a shading model that best approximates a physical material sample and adjusting various input parameters for this shading model to yield a result that visually matches their physical material sample. In the second method, a user may scan a physical material sample using a capture device, such as a mobile device. The scan includes measuring various properties of the physical material sample and prepopulating the various input parameters of a shading model that best approximates the physical material sample. For the second method to be successful, the preprocessing engine 202 performs a calibration once for an image capture component (e.g., camera) in each model of capture device to be supported by the visualization process. The calibration generates a 'SuperLUT'-which is a multidimensional lookup table to model camera response function for each model of capture device. The SuperLUT is also a mapping algorithm. For example, the mapping algorithm can map a synthetically rendered high dynamic range image to the native intensity range of the capture device model. The SuperLUT mapping converts from absolute nits (i.e., candelas per square meter) to a unit-less device specific color space. The aim of the SuperLUT is to correct nonlinearities that exist in the photographic pipeline (e.g., the hardware and software) that governs the camera component on the capture device model being calibrated.

As part of performing the calibration for a capture device model, the preprocessing engine 202 performs one or more of the following operations. The calibration of a capture device model provides an understanding of the capture device model that can be reused at runtime. Even if there is an error in the understanding of the capture device model, the occurrence of new errors cropping up at runtime is not probable. For example, the operation of the calibrated device would be limited to a known valid range of settings, such as ISO, shutter, brightness, etc. The calibrated device may be configured to provide feedback indicating that a setting at runtime is not in valid range of operation to avoid errors.

The preprocessing engine 202 determines a light source intensity of the display screen of the capture device model in nits. A nit is a unit of luminance defined by candela per square meter ($cd/m^2$). A rig as shown in FIG. 2A can be assembled with the capture device model and a color measurement device coupled to the mounts for this measurement in a dark room environment. The preprocessing engine 202 coordinates with the capture device model and the color measurement device to determine XYZ measurements in XYZ color space of the display screen of the capture device. For example, the preprocessing engine 202 sets the brightness of the display screen of the capture device model to full brightness and instructs the color measurement device to measure a single color, such as full white, and store the measurement of light source intensity of the display screen for the capture device model in nits.

The preprocessing engine 202 determines a range of ISO sensitivity values for each shutter speed (e.g., 1/15 of a second, 1/30 of a second, 1/60 of a second, 1/120 of a second, etc.) of the capture device model using a display device. The preprocessing engine 202 configures for a randomized data to be presented on the display device and captured by the capture device model to constrain a collection of ISO sensitivity values to a range that is acceptable for the visualization process. A rig as shown in FIG. 2A can be assembled with the capture device model and a display device coupled to the mounts for measurement in a dark room environment. The preprocessing engine 202 configures the brightness and color of the display device and instructs the capture device model to collect image data which is then processed to determine a range of ISO sensitivity values. For example, the preprocessing engine 202 sets the screen of the capture device to black and the exposure to snap mode. In snap mode, the capture device is configured to snap its shutter to a set of determined shutter speeds and adjust the ISO using an exposure value (EV) formula. The preprocessing engine 202 steps through the brightness and color samples on the display device. The preprocessing engine 202 instructs the capture device to capture results of the screen color on the display device. From the captured results, the preprocessing engine 202 determines and stores the range of ISO sensitivity values for each given shutter speed for the capture device model.

The preprocessing engine 202 determines a brightness value for each shutter speed of the capture device model using a display device. The preprocessing engine 202 configures for a randomized data to be presented on the display device and captured by the capture device model to constrain a collection of display brightness values to a range that is acceptable for the visualization process. A rig as shown in FIG. 2A can be assembled with the capture device model and a display device coupled to the mounts for measurement in a dark room environment. The preprocessing engine 202 configures the brightness and color of the display device and instructs the capture device model to collect image data which is then processed to determine a range of display brightness values. For example, the preprocessing engine 202 sets the screen of the capture device to black. The preprocessing engine 202 steps through the brightness and sets the color of the display device to gray color. The preprocessing engine 202 instructs the capture device to capture results of the screen color on the display device. The preprocessing engine 202 computes the error (e.g., Euclidean RGB distance) between actual sRGB gray color and sRBG captured color to identify the brightness value with the lowest total error for each given shutter speed. The preprocessing engine 202 stores the brightness value for each shutter speed and ISO pair.

The preprocessing engine 202 determines a SuperLUT dataset of color information for each triplet of brightness, ISO, and shutter speed captured by the capture device model and a color measurement device with the aid of a display device. A rig as shown in FIG. 2A can be assembled with the capture device model, a display device, and a color measurement device coupled to the mounts for measurement in a dark room environment. The preprocessing engine 202 coordinates a process in which a predetermined collection of color samples are displayed on the display device and subsequently captured by both the capture device model and the color measurement device. The preprocessing engine 202 compares the captured data values to ensure validity and stores the captured data values into a SuperLUT dataset of color information. In particular, the preprocessing engine 202 configures the brightness and color of the display device using the color samples. The preprocessing engine 202 instructs the capture device model to collect image data of the display device and instructs the color measurement device to collect nits measurements of the display device in XYZ color space. The result of this coordinated process by the preprocessing engine 202 generates the SuperLUT dataset for use in the derivation a camera response function for the capture device model. For example, for each shutter speed and ISO pair, the preprocessing engine 202 sets the capture device exposure to snap mode, sets the brightness of the display device to one corresponding to the shutter speed and ISO pair, configures the color measurement device to measure the color of the display device's screen as high dynamic range chart measurements in XYZ color space, and configures the captured device to capture image data of the display device' screen in sRGB pixel colors. The sRGB and XYZ values for the triplet of brightness, ISO, and shutter speed describe the three-dimensional volumes of color information.

The preprocessing engine 202 generates a SuperLUT for the capture device model using the SuperLUT dataset of color information and a SuperLUT solver implemented by the machine learning engine 166. The SuperLUT solver orchestrates model optimization with the training hyperparameters to generate the SuperLUT. The SuperLUT facilitates forward transform mapping and backward transform mapping. For example, in forward transform mapping, an image from a specific capture device's camera is mapped to absolute nits by mapping color sRGB pixel values in the image to RGB according to the sRGB standard and then mapping to nits using the SuperLUT. In backward transform mapping, a synthetically rendered image can be mapped from nits to the native sRGB color space of the specific capture device's camera by applying the inverse operation. The SuperLUT may be indexed by ISO and shutter speed pair.

The preprocessing engine 202 identifies a closed-form analytic bidirectional reflectance distribution function (BRDF) lobe to generate a shading model that best approximates a physical material sample that serves as a basis of the virtual swatch. The preprocessing engine 202 makes use of linearly transformed cosines (LTC) which is a closed form approximation of the rendering equation in order to model different ways a physical material sample can scatter light. The LTCs may be used to compute an integral with a polygonal light source for fast shading approximation of general BRDFs. After the collection of capture device models to be supported are processed, the preprocessing engine 202 determines a lookup table of linearly transformed cosines (LTC) for each input parameter of a shading model. For example, the input parameters of the shading model may include but are not limited to diffuse albedo, subsurface scattering, specular albedo, sheen, roughness, opacity, dullness, ambient occlusion, clear coat, emissive color, index of refraction, shininess, anisotropy, transmission, or combinations thereof. In another example, the combination of input parameters of the shading model may include but are not limited to diffuse roughness, specular roughness, clear coat roughness, etc. The preprocessing engine 202 determines a linear transform matrix of a cosine weighted BRDF that best approximates the general BRDF for a given roughness and view angle. The preprocessing engine 202 computes this ahead of time for all roughnesses and view angles. The preprocessing engine 202 uses the input of a BRDF shading model and a LTC LUT solver implemented by the machine learning engine 166 to fit linearly transformed cosines to each BRDF of the shading model. The preprocessing engine 202 stores the resulting matrices in lookup tables. The LTC lookup tables offer physically based shading which is differentiable and noise-free.

In addition to calibrating a set of capture device models, the preprocessing engine 202 identifies a set of sample physical materials to use for creating a library of material presets. For example, the set of sample physical materials may include paint, plastic, metal, concrete, asphalt, brick, fabric, etc. The set of sample physical materials is converted to material descriptions and organized into a library of material presets that serve as a starting point for users in the runtime environment. The preprocessing engine 202 processes the set of sample physical materials so that the properties of these set of sample physical materials are known beforehand and can be matched or made to fit many other materials downstream during runtime. A set up as shown in FIG. 2B or FIG. 2C may be assembled in reference mode for processing the set of sample physical materials for conversion into a library of material presets. For example, the rig in FIG. 2B may include one of the calibrated capture devices, the physical material sample in a backing board, and optional display device coupled to the mounts. In some implementations, a feeder can be used to automate the changing of the physical material samples. The preprocessing engine 202 configures the capture device to acquire image data for each physical material sample. For example, the capture device with a front facing camera with depth sensor and calibrated display screen is used to capture color and depth images of the physical material. In some implementations, the preprocessing engine 202 uses the display device as an auxiliary light source during image acquisition of the physical material samples in reference mode. The preprocessing engine 202 acquires a dataset including image data (e.g., RGB data), 3D point data, and metadata (e.g., f-number, shutter, ISO, camera intrinsic matrix, reference resolution and aspect ratio, focal length, etc.) for the physical material sample during the image acquisition.

The preprocessing engine 202 processes the collection of data for the physical material sample acquired during the capture process, the shading model, and the light source intensity of the display screen of the capture device model for organizing the acquired data into a cohesive three dimensional (3D) scene of the physical material sample. The output of the 3D scene for the physical material sample includes information about the camera (e.g., field of view, center of projection, render resolution, etc.), the geometry (e.g., acquired surface plane, normal, triangle mesh, etc.), and the light source (e.g., position, orientation, intensity, etc.). The 3D scene may be the basis for inverse rendering and forward rendering steps used in derivation of the material description information.

The preprocessing engine 202 uses inverse rendering to determine material description for the physical material sample based on the 3D scene generated for the physical material sample. The preprocessing engine 202 uses the light source intensity of the display screen of the capture device model in nits, differentiable and noise-free LTC lookup tables for each lobe (e.g., diffuse, subsurface, specular, sheen, opacity, dullness, ambient occlusion, clear coat, emissive color, index of refraction, scattering, transmission, anisotropy, shininess, etc.), SuperLUT of the capture device model, and 3D scene for the physical material sample as input in conjunction with a material description solver and training hyper parameters (e.g., learning rate, number of steps per epoch, convergence criteria, etc.) implemented by the machine learning engine 166 to generate values for the BRDF shading model including but not limited to diffuse albedo, subsurface scatter, specular albedo, retroreflection, sheen, roughness, opacity, dullness, ambient occlusion, clear coat, emissive color, index of refraction, transmission, anisotropy, shininess, or combinations thereof. The resulting BRDF values for the shading model forms the material description for the physical material sample. The material description solver implements a closed-form rectangular light sampling approach using the machine learning engine 166 as a network to provide forward computation and back propagation. In the forward computation, the material description solver creates a rendered image. The material description solver determines a composite error value or loss by comparing the rendered image to the source or captured image of the physical material sample. The material description solver back propagates loss through the network to update the initial guess at material description. The material description solver repeats this process of forward computation, loss, back propagation, and update material description until a convergence criteria is met.

When the set of set of sample physical materials have been processed and their material descriptions are determined, the preprocessing engine 202 creates a library or dictionary of material presets. The library of material presets is a collection of material descriptions to be browsed by a user at runtime. The material descriptions may be organized by material identifier. The material identifier may be associated with metadata such as material name, description, and tags to group similar materials together. The preprocessing engine 202 stores the library of material presets 211 in the data storage 280.

The preprocessing engine 202 creates a library of environment presets. The preprocessing engine 202 uses captured images to create environment maps (e.g., cubic environment maps). The preprocessing engine 202 then white balances the environment maps for correction. The preprocessing engine 202 constructs a virtual representation of light from the high dynamic range (HDR) environment maps and various adjustments, such as exposure, rotation transformation, animation, etc. are then imposed to create the library of environment presets. The collection of environment maps may be organized by environment identifier. The environment identifier may be associated with metadata, such as environment name, description, and tags. The preprocessing engine 202 stores the library of environment presets 212 in the data storage 280.

The preprocessing engine 202 creates a library of geometry presets using renderable scene geometry with mathematical description for a plurality of different shapes or objects. The preprocessing engine 202 imposes various adjustments, such as rotational and translational transformation, scale adjustments, etc. to diversify the library of geometry presets. The collection of geometries may be organized by geometry identifier. The geometry identifier may be associated with metadata, such as geometry name, description, and tags. The preprocessing engine 202 stores the library of geometry presets 213 in the data storage 280.

The preprocessing engine 202 creates a library of camera presets by constructing a plurality of virtual cameras. Each camera preset includes a mathematical description of the digital photographic system of that camera. The preprocessing engine 202 imposes various adjustments, such as focal length, rotational and translational transformation, scale adjustments, etc. to diversify the library of camera presets. The collection of cameras may be organized by camera identifier. The camera identifier may be associated with metadata, such as camera name, description, focal length, and tags. The preprocessing engine 202 stores the library of camera presets 214 in the data storage 280.

The runtime engine 204 uses the results of the preprocessing engine 202 for creating and editing the virtual material swatches for physical material samples. A virtual material swatch may be defined as a virtual representation of a physically based material that includes a virtual three dimensional scene and output media. The runtime engine 204 acquires a scan of a user material sample when a user creator captures one or more images of the user material sample using a supported capture device model. For example, a set up as shown in FIG. 2C may be used in standalone mode for acquiring a scan of a user material. The scan provides a source media and the material. In some implementations, the runtime engine 204 receives user selection of one or more virtual assets, such as a material preset, an environment preset, geometry preset, and camera preset for creating the virtual material swatch based on the user material sample. For example, the material preset may be selected from a material preset library including material presets for paint, plastic, metal, fabric, asphalt, concrete, brick, glass, etc. The environment preset may be selected from an environment preset library including environment presets for studio lighting, cloudy day, rainy day, sunny day, dawn, dusk, indoor, outdoor, etc. The geometry preset may be selected from a geometry preset library including geometry presets for a sphere, a cylinder, a cube, etc. The camera preset may be selected from a camera preset library including camera presets for telephoto, fisheye, wide-angle, standard, macro, etc.

Figure 6:
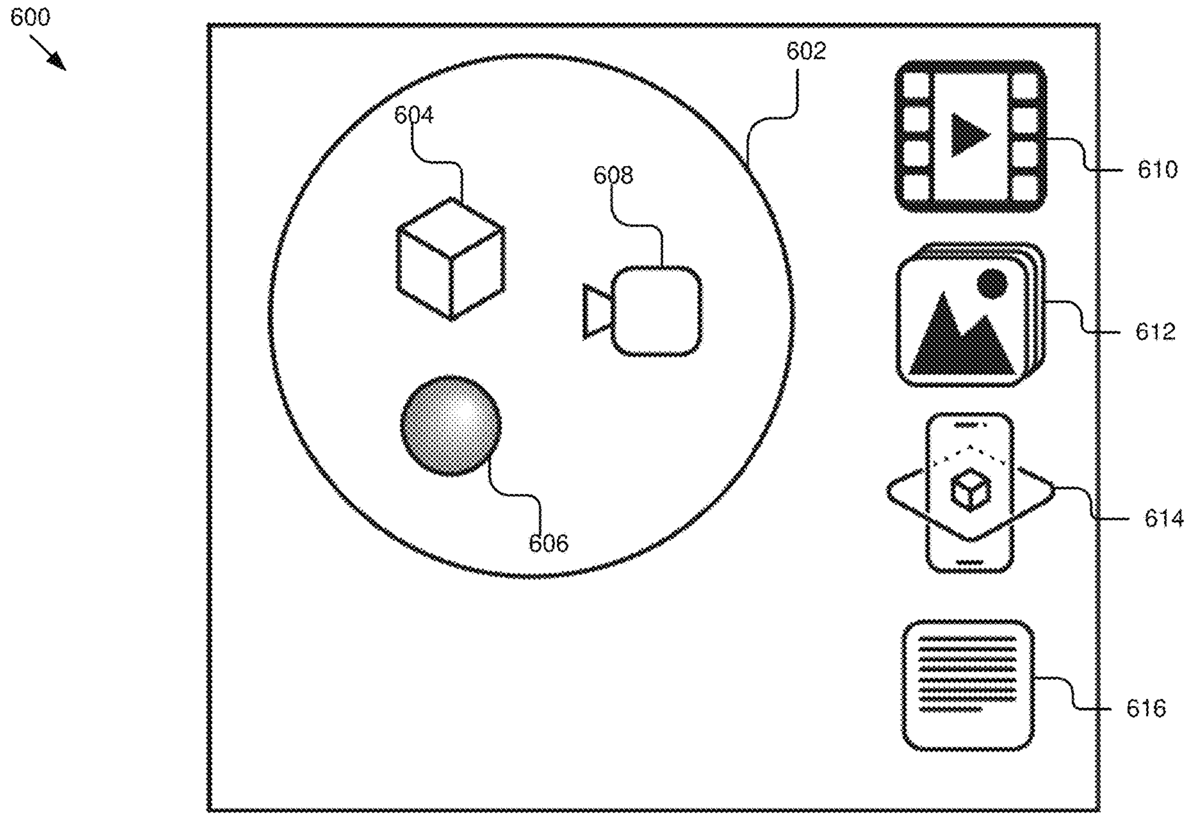
FIG. 6 illustrates a graphical representation of an example virtual material swatch according to some implementations.

The runtime engine 204 assembles and constructs a virtual scene using the environment lighting, the renderable scene geometry, the virtual camera, and the material description. The virtual scene may also include metadata meaningful to the creator user of the scene, such as product information, output settings, etc. The runtime engine 204 configures and generates one or more output media to visually describe the user material sample once the virtual scene is assembled. For example, the output media may include images, animated movie files, self-contained augmented reality experiences, simulations, etc. In some implementations, the runtime engine 204 enables the user to edit the virtual material swatch. For example, the runtime engine 204 may generate a user interface for presenting to the user to adjust the color of the material, the rotation of the environment map, the scale of the geometry, a depth of field of the camera, settings of the output (e.g., resolution, aspect ratio, frame rate of the output video file, encoding, bitdepth, etc.), etc. The virtual scene, combined with the generated output, may be referred to as the virtual material swatch. FIG. 6 illustrates a graphical representation of an example virtual material swatch 600 according to some implementations. The virtual material swatch 600 includes one or more of environment maps 602, geometry 604, material description 606 assigned to the geometry 604, and a render camera 608. The material description 606 of the virtual material swatch characterizes the visual properties of the physical material associated with the virtual material swatch. The virtual material swatch 600 may also include one or more output movie files 610, one or more output image files 612, one or more output AR experiences 614, and metadata 618. In some implementations, the runtime engine 204 creates a virtual material swatch collection that represents an organized group of material swatches created from a collection of user material samples provided by a user creator. For example, the virtual material swatch collection may represent a single entity with multiple material references. The collection of virtual material swatches may be organized by virtual material swatch identifier. The virtual material swatch identifier may be associated with metadata, such as entity or product name, description, and tags. The runtime engine 204 stores the virtual material swatch collection 215 in the data storage 243.

Figure 4:
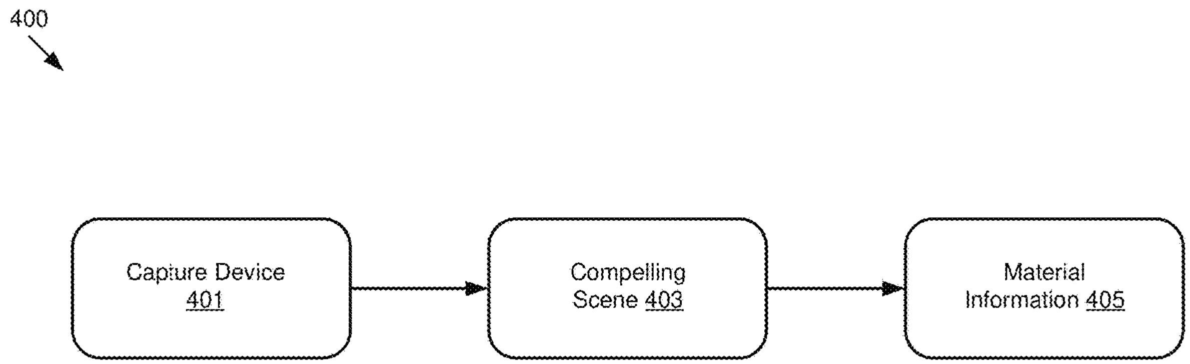
FIG. 4 is a block diagram illustrating deriving of material information from a captured image of a material in a scene according to some implementations.

In some implementations, a user creator may wish to customize a material preset for creating a virtual material swatch from a user material sample. FIG. 4 is a block diagram illustrating deriving of material information from a captured image of a material in a scene according to some implementations. The capture device 401 may be positioned in front of a physical material present within a compelling scene 403 to capture data, such as RGB and depth data of the physical material. For example, the capture device 401 is a supported model with preprocessing done to it to calibrate its light for acquisition of material samples at runtime. The compelling scene 403 may include a variety of materials in variety of textures observed in uncontrolled lighting. The runtime engine 204 may generate a virtual representation of parts of the compelling scene 403. For example, the runtime engine 204 uses geometry fitting to simplify the generation of the virtual representation and then derive other data (e.g., surface normal, etc.) to enrich the model of the scene. From the virtual representation, the runtime engine 204 solves for material information 405 useful for principled surface shader parameters, such as diffuse RGB, specular RGB, specular roughness, etc. The runtime engine 204 creates a virtual scene that includes a virtual camera, environment lighting, and renderable scene geometry onto which the solved material information is assigned.

Figure 5:
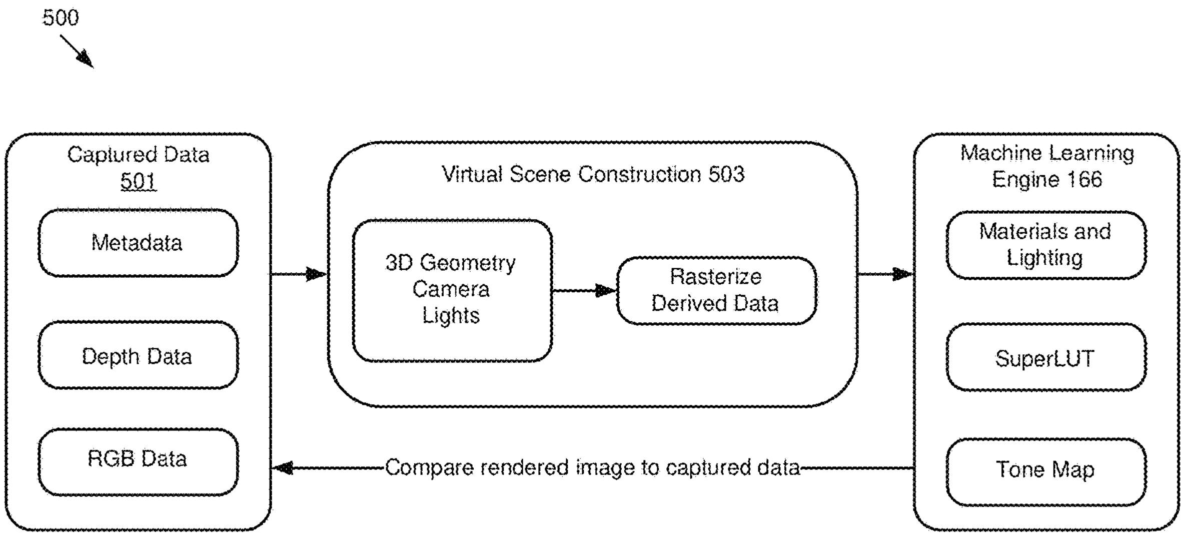
FIG. 5 is a block diagram illustrating an optimization loop for solving material information using a machine learning framework according to some implementations.

FIG. 5 is a block diagram illustrating solving for material information using a machine learning framework according to some implementations. The runtime engine 202 acquires captured image data 501 of a user material sample from a capture device model. For example, the capture device with a front facing camera with depth sensor and display screen is used to capture color and depth images of the user material sample using the configuration shown in FIG. 2C. The captured data 501 includes RGB data, depth data (e.g., 3D point data), and metadata (e.g., f-number, shutter, ISO, camera intrinsic matrix, reference resolution and aspect ratio, focal length, etc.) during the image acquisition. The runtime engine 202 performs a virtual scene construction 503 where 3D geometry (e.g. triangle representation) is converted to rasterized image data. The machine learning engine 166 implements a solver for solving each one of material information, SuperLUT, and tone map. For example, a solver for material information implemented by the machine learning engine 166 starts an optimization loop, feeds the input into an optimization model, computes loss, back propagates error, and updates material description until convergence criteria is met.

The visualization engine 206 provides access to the virtual material swatch collection 215 for a consumer and facilitates with visualizing the virtual material swatches for different contexts. For example, the visualization engine 206 presents a visualization of the virtual material swatch to the consumer as one of an interactive augmented reality (AR) experience, an interactive real time experience on the mobile device, and on a website in a supported web browser as a pre-rendered images and movies based on the accessing application and the consumer device. In some implementations, the visualization engine 206 classifies a virtual material swatch (e.g., from scan or existing) to find a closest match in the virtual material swatch collection 215. In some implementations, the visualization engine 206 uses material description (e.g., BRDF values) and metadata from a virtual material swatch as input to an external product search system to search for products with similar material descriptions. For example, the visualization engine 206 generates a search query to run on a product database using colors or material tags. In some implementations, the visualization engine 206 may use the material description of a virtual material swatch to help refine product recommendations for the consumer.

Simulation Data Generator 168

The simulation data generator 168 may convert the virtual material swatches accessible in the data storage 280 in different ways to generate simulation data. For example, virtual material swatches on static objects (e.g., highway signs, lane markings, road surfaces, pedestrians, vehicles, etc.) may be used as a source of data that is based on ground level truth about real world driving situations to generate the simulation data. In many implementations, the simulation data represents an editable source of truth defining a number of simulation scenarios. The simulation data may, for example, be used in simulations of a perception subsystem 154 or a planning model. However, more generally, the simulation data could be used for other purposes, such as procedural scene generation as one example.

Machine Learning Engine 166

In some implementations, the computing system 300 includes a machine learning engine 166 to train a machine learning model 224. In one implementation, the machine learning model 224 is a neural network model and includes a layer and/or layers of memory units where memory units each have corresponding weights. A variety of neural network models can be utilized including feed forward neural networks, convolutional neural networks, recurrent neural networks, radial basis functions, other neural network models, as well as combinations of several neural networks. Additionally, or alternatively, the machine learning model 224 can represent a variety of machine learning techniques in addition to neural networks, for example, support vector machines, decision trees, Bayesian networks, random decision forests, k-nearest neighbors, linear regression, least squares, other machine learning techniques, and/or combinations of machine learning techniques.

In some implementations, the machine learning model 224 may be trained using any one of at least one of supervised learning (e.g., support vector machines, neural networks, logistic regression, linear regression, stacking, gradient boosting, etc.), unsupervised learning (e.g., clustering, neural networks, singular value decomposition, principal component analysis, etc.), or semi-supervised learning (e.g., generative models, transductive support vector machines, etc.). Additionally, or alternatively, machine learning models in accordance with some implementations may be deep learning networks including recurrent neural networks, convolutional neural networks (CNN), networks that are a combination of multiple networks, etc. In some implementations, the machine learning engine 166 implements one or more solvers to orchestrate model optimization by coordinating the network's forward inference and backward gradients to form parameter updates that attempt to improve the loss. The framework of the machine learning engine 166 may be realized using Tensorflow, Pytorch, CoreML, etc.

Figure 7:
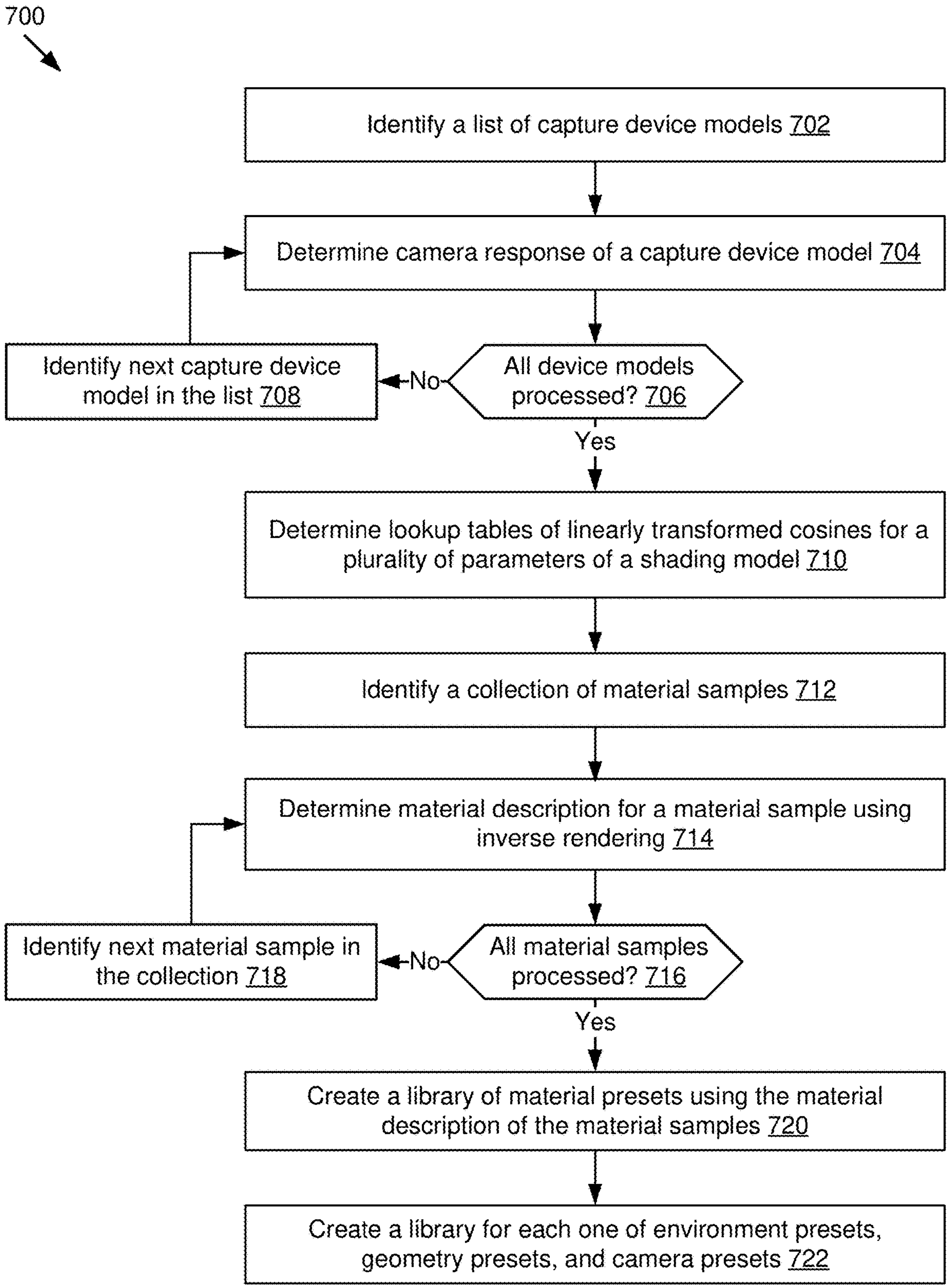
FIG. 7 is a flow chart illustrating an example method of preprocessing for generating a virtual material swatch according to some implementations.

Referring now to FIG. 7, a method 700 of preprocessing for generating a virtual material swatch in accordance with some implementations is illustrated. Moreover, while in some implementations, the sequence of operations may be fully automated, in other implementations some steps may be performed and/or guided through human intervention. Furthermore, it will be appreciated that the order of operations in the sequence may be varied, and that some operations may be performed in parallel and/or iteratively in some implementations.

In block 702, a list of capture device models is identified. For example, a list of capture device models that are to be supported at runtime are identified. In block 704, a camera response of a capture device model is determined. For example, the calibration generates 'SuperLUT'-a multidimensional lookup table to model the camera response function of the capture device model. In block 706, a determination is made as to whether all device models in the list are processed. If the determination is that not all device models are processed, in block 708, a next capture device model in the list is identified and the method 700 repeats from block 704. If the determination is that all device models have been processed, in block 710, lookup tables of linearly transformed cosines for a plurality of parameters of a shading model is determined. For example, the input parameters of the shading model may include but are not limited to diffuse albedo, surface scattering, specular albedo, sheen, roughness, opacity, dullness, ambient occlusion, clear coat, emissive color, index of refraction, shininess, anisotropy, transmission, or combinations thereof. In block 712, a collection of material samples to process is identified. For example, a set of sample physical materials are identified to use for creating a library of material presets. The set of sample physical materials are preprocessed so that the properties of these set of sample physical materials are known beforehand and can be matched or made to fit many other materials downstream during runtime. In block 714, a material description for a material sample is determined using inverse rendering. For example, a supported capture device model with a front facing camera, depth sensor, and calibrated display screen is used to acquire color and depth images of the material sample. The acquired data is transformed into a cohesive 3D scene. A material description in the form of BRDF values for a shading model is determined based on the 3D scene that is used for inverse rendering. In block 716, a determination is made as to whether all material samples are processed. If the determination is that not all material samples are processed, in block 718, a next material sample in the collection is identified. If the determination is that all material samples have been processed, in block 720, a library of material presets using the material description of the material samples is created. For example, the library of material presets is a collection of material descriptions to be browsed by a user at runtime. A material preset library includes material presets for paint, plastic, metal, fabric, asphalt, concrete, brick, glass, etc. In 722, a library for each one of environment presets, geometry presets, and camera presets is also created. For example, an environment preset library includes environment presets for studio lighting, cloudy day, rainy day, sunny day, dawn, dusk, indoor, outdoor, etc. The geometry preset library includes geometry presets for a sphere, a cylinder, a cube, etc. The camera preset library includes camera presets for telephoto, fisheye, wide-angle, standard, macro, etc.

Figure 8:
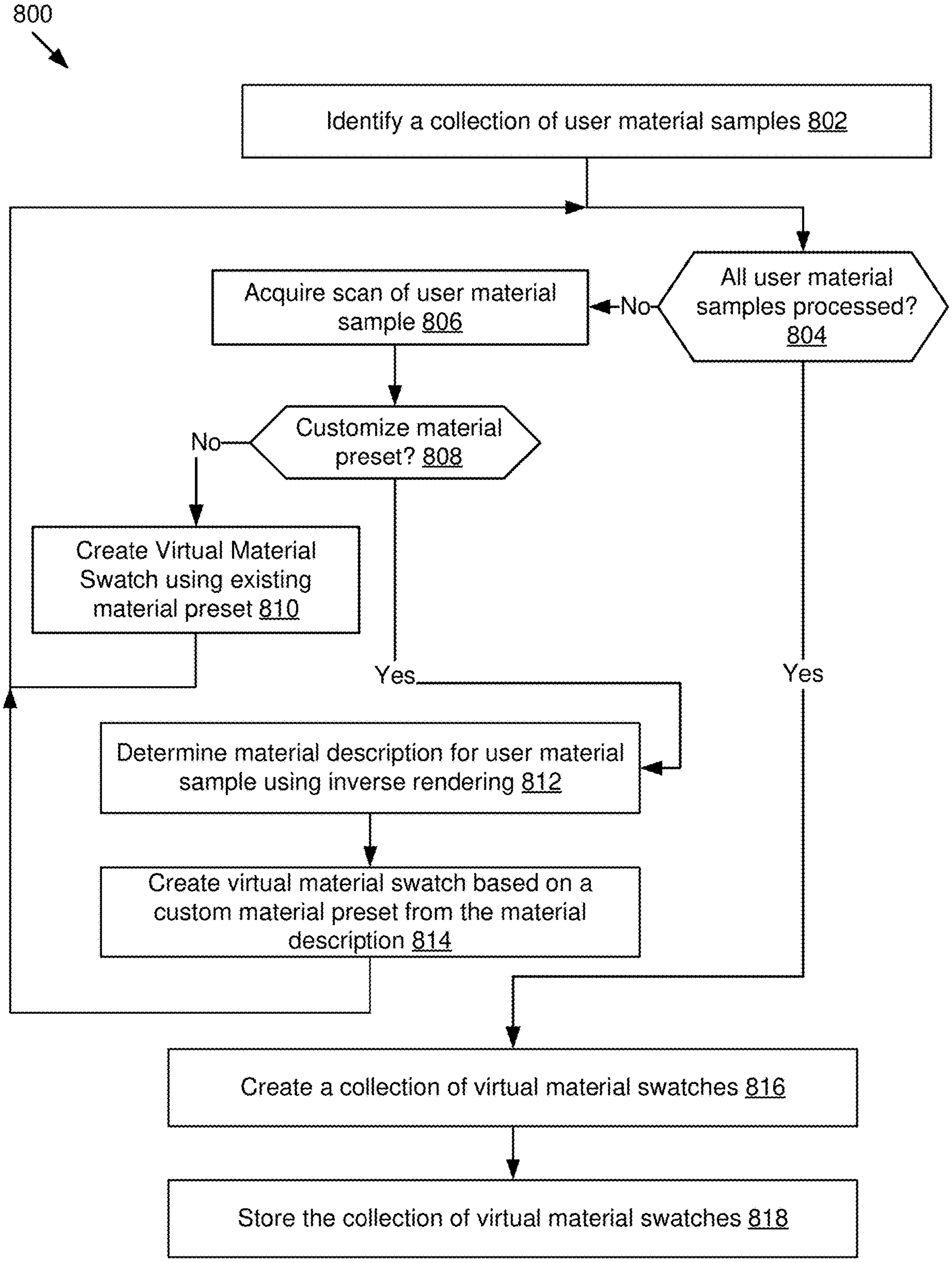
FIG. 8 is a flow chart illustrating an example method of creating a collection of virtual material swatches according to some implementations.
Figure 9:
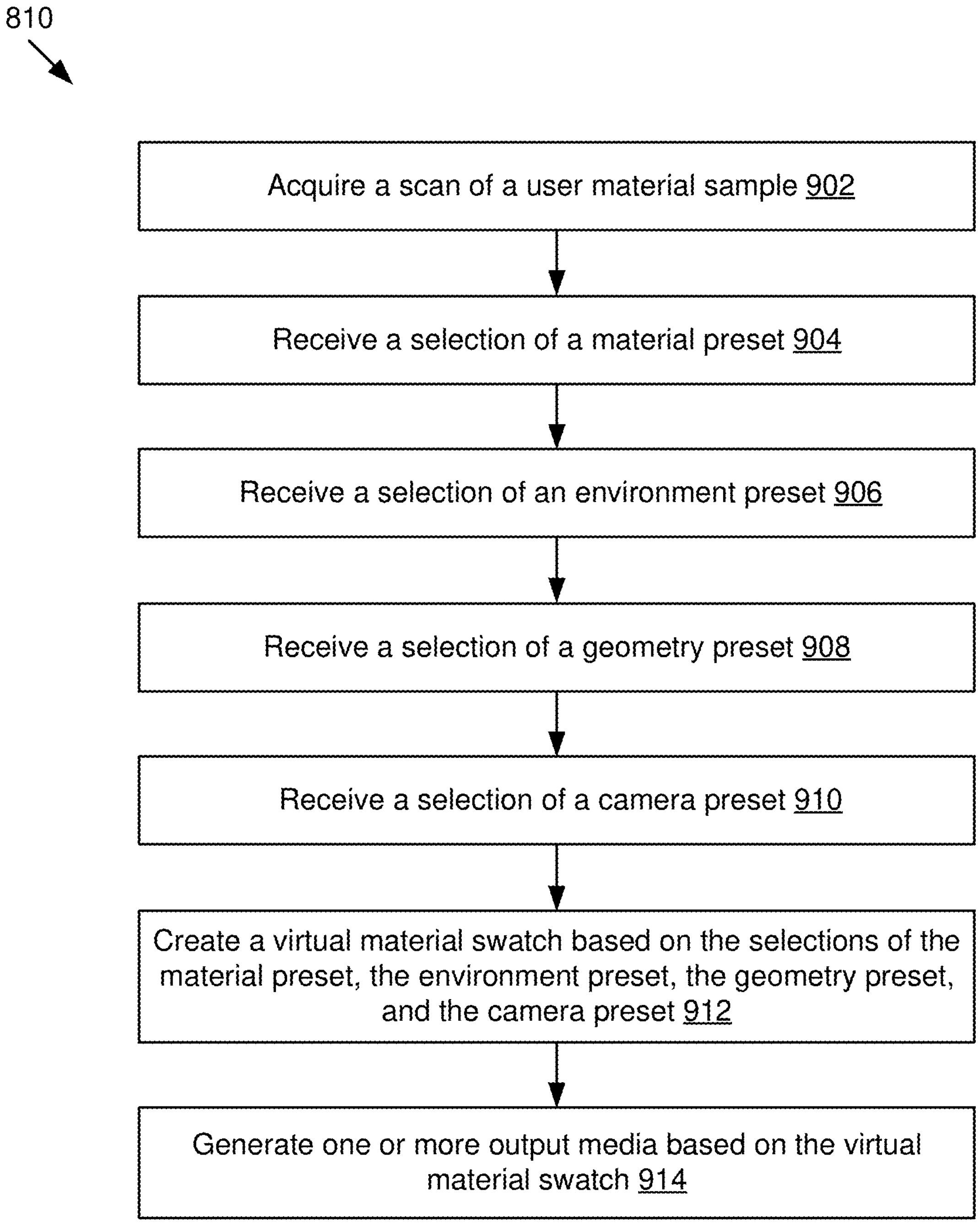
FIG. 9 is a flow chart illustrating an example method of creating a virtual material swatch according to some implementations.

Referring now to FIG. 8, a method 800 of creating a collection of virtual material swatches in accordance with some implementations is illustrated. In block 802, a collection of user material samples to process for conversion to virtual material swatches is identified. In block 804, a determination is made whether all user material samples are processed. If the determination is that not all user material samples are processed, then in block 806, a scan of a user material sample in the collection is acquired. In block 808, a determination is made whether a customized material preset is desired for the user material sample. If the determination is that a customized material preset is desired, then in block 812, material description for the user material sample is determined using inverse rendering. In block 814, a virtual material swatch based on a custom material preset from the material description is created and the method 800 repeats from block 804. If the determination in block 808 is that the customized material preset is not desired, then in block 810, a virtual material swatch is created using existing material preset and the method 800 repeats from block 804. If the determination in block 804 is that all user material samples are processed, then in block 816, a collection of virtual material swatches is created. In block 818, the collection of virtual material swatches is stored.

Referring now to FIG. 8, a method 810 of creating a virtual material swatch in accordance with some implementations is illustrated. In block 902, a scan of the user material sample is acquired. In block 904, a selection of a material preset from a library of material presets is received. In block 906, a selection of an environment preset from a library of environment presets is received. In block 908, a selection of a geometry preset from a library of geometry presets is received. In block 910, a selection of a camera preset from a library of camera presets is received. In block 912, a virtual material swatch for the user material sample is created based on the selections of the material preset, the environment preset, the geometry preset, and the camera preset. In block 914, one or more output media based on the virtual material swatch is generated.

The previous description is provided to enable practice of the various aspects described herein. Various modifications to these aspects will be understood, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order, and are not meant to be limited to the specific order or hierarchy presented.

The previous description of the disclosed implementations is provided to enable others to make or use the disclosed subject matter. Various modifications to these implementations will be readily apparent, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As will be appreciated, the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles “a,” “an” or “the” is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be implemented in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable others to make or use the present disclosure. Various modifications to these examples will be readily apparent, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method of generating a virtual material swatch of a physical material, the method comprising:

acquiring a scan of a sample of the physical material using a capture device model, wherein an image capture component of the capture device model is pre-calibrated to support the acquiring;

receiving a selection of a material preset;

receiving a selection of an environment preset;

receiving a selection of a geometry preset;

receiving a selection of a camera preset; and generating the virtual material swatch of the physical material using a material description of the material preset, an environmental lighting of the environment preset, a renderable scene geometry of the geometry preset, and a virtual camera of the camera preset, the virtual material swatch including a virtual three-dimensional scene visualizing the physical material.

2. The method of claim 1, wherein the image capture component of the capture device model is pre-calibrated by:

determining a range of ISO values for each shutter speed of the image capture component using a display device;

determining a brightness value for each shutter speed of the image capture component using the display device;

determining a dataset of color information for each triplet of brightness, ISO, and shutter speed captured by the image capture component and a color measurement device using the display device; and solving for a multidimensional lookup table describing a camera response function of the image capture component using a first machine learning based solver and the dataset of color information.

3. The method of claim 1, further comprising:

determining a material description for the physical material; and receiving a selection of the material description to use as a custom material preset for generating the virtual material swatch of the physical material.

4. The method of claim 3, wherein determining the material description for the physical material further comprises:

positioning the sample of the physical material within a field of view of the image capture component of the capture device model in a reference mode;

acquiring a physical material dataset including image data and depth data of the sample of the physical material using the image capture component of the capture device model;

generating a three-dimensional scene of the sample of the physical material using the physical material dataset; and determining the material description from the three-dimensional scene of the sample of the physical material using inverse rendering.

5. The method of claim 4, wherein determining the material description from the three-dimensional scene of the sample of the physical material using inverse rendering further comprises:

determining a light source intensity of a display screen of the capture device model;

determining a multidimensional lookup table describing a camera response function of the image capture component of the capture device model;

determining lookup tables of linearly transformed cosines for a plurality of parameters of a shading model; and solving for the material description using the light source intensity, the multidimensional lookup table, the lookup tables of linearly transformed cosines, and the three-dimensional scene of the sample of the physical material as input to a second machine learning based solver.

6. The method of claim 1, further comprising:

generating one or more output media based on the virtual three-dimensional scene visualizing the physical material.

7. The method of claim 6, further comprising:

generating simulation data for procedural scene generation based on the one or more output media; and training a machine learning model for a control system of an autonomous vehicle using the simulation data.

8. The method of claim 1, wherein:

receiving the selection of the material preset includes receiving the selection of the material preset from a library of material presets;

receiving the selection of the environment preset includes receiving the selection of the environment preset from a library of environment presets;

receiving the selection of the geometry preset includes receiving the selection of the geometry preset from a library of geometry presets; and receiving the selection of the camera preset includes receiving the selection of the camera preset from a library of camera presets.

9. The method of claim 8, wherein:

the material preset selected from the library of material preset is at least one from a group of paint, plastic, metal, fabric, asphalt, concrete, brick, and glass;

the environment preset selected from the library of environment presets is at least one from a group of studio lighting, cloudy day lighting, rainy day lighting, sunny day lighting, dawn lighting, dusk lighting, indoor lighting, outdoor lighting;

the geometry preset selected from the library of geometry presets is at least one from a group of a sphere, a cylinder, and a cube; and the camera preset selected from the library of camera presets is at least one from a group of telephoto, fisheye, wide-angle, standard, and macro.

10. The method of claim 5, wherein the material description is in a form of bidirectional reflectance distribution function (BRDF) values of the shading model.

11. The method of claim 10, wherein BRDF values of the shading model include roughness, diffuse albedo, subsurface scattering, specular albedo, sheen, opacity, dullness, ambient occlusion, clear coat, emissive color, index of refraction, transmission, anisotropy, and shininess.

12. A system comprising one or more processors and memory operably coupled with the one or more processors, wherein the memory stores instructions that, in response to execution of the instructions by the one or more processors, cause the one or more processors to perform operations including:

acquiring a scan of a sample of a physical material using a capture device model, wherein an image capture component of the capture device model is pre-calibrated to support the acquiring;

receiving a selection of a material preset;

receiving a selection of an environment preset;

receiving a selection of a geometry preset;

receiving a selection of a camera preset; and generating a virtual material swatch of the physical material using a material description of the material preset, an environmental lighting of the environment preset, a renderable scene geometry of the geometry preset, and a virtual camera of the camera preset, the virtual material swatch including a virtual three-dimensional scene visualizing the physical material.

13. The system of claim 12, wherein the image capture component of the capture device model is pre-calibrated by:

determining a range of ISO values for each shutter speed of the image capture component using a display device;

determining brightness value for each shutter speed of the image capture component using the display device;

determining a dataset of color information for each triplet of brightness, ISO, and shutter speed captured by the image capture component and a color measurement device using the display device; and solving for a multidimensional lookup table describing a camera response function of the image capture component using a first machine learning based solver and the dataset of color information.

14. The system of claim 12, wherein the operations further comprise:

determining a material description for the physical material; and receiving a selection of the material description to use as a custom material preset for generating the virtual material swatch of the physical material.

15. The system of claim 14, wherein determining the material description for the physical material further comprises:

positioning the sample of the physical material within a field of view of the image capture component of the capture device model in a reference mode;

acquiring a physical material dataset including image data and depth data of the sample of the physical material using the image capture component of the capture device model;

generating a three-dimensional scene of the sample of the physical material using the physical material dataset; and determining the material description from the three-dimensional scene of the sample of the physical material using inverse rendering.

16. The system of claim 15, wherein to determining the material description from the three-dimensional scene of the sample of the physical material using inverse rendering further comprises:

determining a light source intensity of a display screen of the capture device model;

determining a multidimensional lookup table describing a camera response function of the image capture component of the capture device model;

determining lookup tables of linearly transformed cosines for a plurality of parameters of a shading model; and solving for the material description using the light source intensity, the multidimensional lookup table, the lookup tables of linearly transformed cosines, and the three-dimensional scene of the sample of the physical material as input to a second machine learning based solver.

17. The system of claim 12, wherein the operations further comprise:

generating one or more output media based on the virtual three-dimensional scene visualizing the physical material.

18. The system of claim 17, wherein the operations further comprise:

generating simulation data for procedural scene generation based on the one or more output media; and training a machine learning model for a control system of an autonomous vehicle using the simulation data.

19. The system of claim 12, wherein:

receiving the selection of the material preset includes receiving the selection of the material preset from a library of material presets;

receiving the selection of the environment preset includes receiving the selection of the environment preset from a library of environment presets;

receiving the selection of the geometry preset includes receiving the selection of the geometry preset from a library of geometry presets; and receiving the selection of the camera preset includes receiving the selection of the camera preset from a library of camera presets.

20. The system of claim 19, wherein:

the material preset selected from the library of material preset is at least one from a group of paint, plastic, metal, fabric, asphalt, concrete, brick, and glass;

the environment preset selected from the library of environment presets is at least one from a group of studio lighting, cloudy day lighting, rainy day lighting, sunny day lighting, dawn lighting, dusk lighting, indoor lighting, outdoor lighting;

the geometry preset selected from the library of geometry presets is at least one from a group of a sphere, a cylinder, and a cube; and the camera preset selected from the library of camera presets is at least one from a group of telephoto, fisheye, wide-angle, standard, and macro.

* * * * *